United States Patent Office 2,871,247
Patented Jan. 27, 1959

2,871,247

PROCESS FOR PRODUCING AMINO-ESTERS

Marius Séon, Paris, and Georges Wetroff and Jean Leleu, Aubervilliers, France, assignors to Pechiney, Compagnie de Produits Chimiques et Electrometallurgiques, Paris, France, a corporation of France No Drawing. Application March 29, 1954
Serial No. 419,614

Claims priority, application France April 2, 1953

6 Claims. (Cl. 260—404)

This invention relates to the transformation of nitrilo-carboxylic acids, and in particular, omega nitrilo-acids having 7 to 10 carbon atoms in their molecules into easily purified corresponding amino-esters.

The polycondensation of omega amino-carboxylic acids by the usual processes for obtaining superpolyamides, yields polycondensates possessing attractive properties only if the amino-acid used is of a high degree of purity. The purification by crystallization is possible with omega amino-acids having 10 or more $CH_2$ groups in a straight chain between the terminal functional groups, COOH and $NH_2$, because such acids are relatively low in their solubility in water. The difficulties increase with amino-acids having less than 10 $CH_2$ groups. Even 10-amino-decanoic-acid is very hard to purify by crystallization with satisfactory yields and this difficulty cannot be practically overcome with $C_9$ or $C_8$ or $C_7$ omega amino-acids.

It is known, however, (1) that superpolyamides may be formed through the polycondensation of omega amino-esters, (2) that it is much easier to purify these esters than the corresponding amino-acids, and (3) that the shorter the chain is the easier is their rectification. Great technical difficulties are encountered in the esterification of amino-acids because, in the course of this operation, a part of the acid or of the amino-ester is condensed and the yield of the operation becomes very low.

In accordance with the present invention, it has now been discovered that a very practical process for obtaining omega amino-esters having a straight chain of 7 to 10 carbon atoms in its molecule, involves commencing with the corresponding nitrilo-acid, esterifying the same with an alcohol of low molecular weight and then hydrogenating the crude nitrile to convert the same into an amino-ester, which product can be easily purified and rectified.

When the above procedure is applied with the precautions set out below, the esterification as well as the hydrogenation give very high yields. A quite pure omega amino-ester is obtained without any formation of resins and this amino-ester is capable of being directly condensed, in a non-oxidizing atmosphere, to form a superpolyamide of outstanding qualities.

The esterification of the nitrilo-acid is preferably effected by means of ethyl alcohol of a concentration of 96 to 100%, or another light alcohol, in the presence of a small amount of concentrated sulphuric acid or other esterification catalyst. It is advantageous to add to the mixture a compound forming a ternary azeotropic mixture with water and alcohol, so that water may be eliminated by distillation as it forms. Benzene serves this purpose well, but other hydrocarbons can be used. The yield of the operation is very high because the nitrile group does not react with the acid or the ester groups. A small potrion only of the nitrilo becomes hydrated during the operation and is transformed into the ester, which results in the production of a small amount of diester. The incidence of this extraneous reaction is lessened by progressively introducing the sulphuric acid into the mixture in increments as the elimination of water proceeds.

It is not necessary to separate the diester from the nitrile-ester. Excess alcohol and benzene are merely distilled off, the crude nitrile is washed with slightly alkaline aqueous solution and it is then subjected to hydrogenation. It is known that the hydrogenation of simple nitriles into amines occurs well in the presence of hydrogenation catalysts such as nickel and cobalt, and that for better yields of primary amines, it is advantageous to operate in an ammoniacal atmosphere. When a nitrile which does not contain other functional groups is hydrogenated, the presence of ammonia does not require special precautions. In the present process, however, the ester functional group in the molecule causes extraneous or side reactions, which decrease the yield.

In accordance with a specific feature of the invention, this drawback is avoided by adding to the mixture to be hydrogenated an amount of alcohol preferably about double that of the nitrilo compound used. Triple amounts of alcohol or even more can be used with advantage. The parts are by weight.

The hydrogenation is preferably carried out at a temperature between 70 and 160° C. in the presence of ammonia and alcohol, each in the amount of 2 to 3 times that of the nitrilo compound, under a pressure of hydrogen higher than one atmosphere, with the use of hydrogenation catalysts of the type of nickel, cobalt and the like. The operation is rapid and leads, without difficulty, to the primary amine in very good yield.

The amino ester obtained is ordinarily then purified. Its main impurities are the di-ester formed by a secondary reaction during the esterification and a little secondary amine produced in the course of the hydrogenation. The secondary ester-amine impurity is separated by rectifying the product in a high vacuum, and the secondary amine is eliminated as the residue of the distillation. Then the di-ester is separated from the distilled product by treating the same with a sufficient amount of a weak solution of acid for salifying the amine function or amine groups. The di-ester is then extracted by means of a solvent. Finally the amino-ester is regenerated by adding and reacting with the theoretical proportion of caustic soda or other alkali and it is separated from the aqueous layer. Thus a pure amino-ester is obtained in very good yield. It may be directly used as raw material for the preparation of superpolyamides.

Nitrilo-azelaic acid for use in the process of the invention may be obtained in the following way. Three and three tenths kilograms of oleic acid 80% concentration, obtained from oil extracted from olive cake, are heated in the presence of 50 gs. of nickel acetate at 270° C. in a flask provided with a stirring device and with a reflux cooler heated to 100° C. by means of steam passing through its jacket. The container is also provided with an inlet for ammonia which is introduced for six hours. Thereupon 2.6 kgs. of impure oleic nitrile are separated by distillation at reduced pressure.

These 2.6 kgs. of oleic nitrile are charged into a flask surmounted with a reflux cooler, with a stirrer and a funnel with stopper and stopcock. While the content of the flask is heated to 80° C. the following mixture is fed by means of the funnel, in a very thin stream: 5.7 kgs. $H_2SO_4$, 3.3 kgs. $CrO_3$, and 7 kgs. $H_2O$. After the one hour taken for this operation, the mixture is maintained at 80° C. for three hours more, under stirring. The organic layer is separated by decantation and washed with concentrated sulphuric acid and then with water. The sulpho-chromic liquor may serve several times, after electrolytic regeneration. The organic layer is subjected to fractional distillation under 2 to 3 mms. of mercury pressure. The fraction, boiling in the range of 135–170° C., contains 8-cyano-octanoic acid. This acid is treated in a continuous extractor with a gasoline fraction distilling from 100° C. to 120° C. The 8-cyano-octanoic acid is insoluble. One kilogram of it is obtained.

*Example*

The nitrile of azelaic acid is esterified with ethanol in the following way. In a boiler of a rather efficient plate tower (30 to 40 plates), the following products are introduced:

1.0 kg. of azelaic acid nitrile
1.2 kgs. of absolute ethanol
1.2 kgs. of benzene
48 gs. of sulphuric acid of 60° Baumé

A ternary water-alcohol-benzene azeotropic mixture is obtained at the top and is removed. When a marked slowing of the formation of the heterogeneous azeotropic mixture is observed, a new portion of 18 gs. of sulphuric acid is added and the operation is continued until there is no longer a formation of two layers in the colder section at the top of the column. Benzene and alcohol are then flashed off and a washing is effected using slightly alkalinified water. Crude nitrilo ester in an amount of 1.105 kgs. is obtained, which contains, according to analysis, 6% of ethyl-azelaate due to partial hydrolysis of the ethyl azelaate nitrile.

The nitrilo ester so obtained is placed within a stainless steel autoclave having the capacity of 15 liters and provided with stirring means. To it is added 2.5 kgs. of 96° ethanol, 2.5 kgs. of liquid ammonia and 125 gs. of Raney nickel containing 3% cobalt. The mixture is heated to 90° C. under 150 kgs./cm.$^2$ of hydrogen (total pressure: 210 kgs./cm.$^2$). The hydrogen comes from the electrolytic regeneration of the sulpho-chromic liquor. The hydrogenation takes about 4 hours.

Crude ethyl amino-pelargonate is distilled continuously under a vacuum of 0.5 mm. of mercury. (It boils at 100° C. under this pressure.) A colorless distillate in an amount of 1.04 kgs. is obtained and 80 gs. of a residue which contains primarily a secondary amino-ester, due to a side reaction. The distilled amino-ester still contains 6% of ethyl azelaate which is removed by the following treatment: The amino-ester is dissolved in a weak solution of hydrochloric acid, composed of 10 kgs. of water and 2.05 ls. of HCl (2.6 N). A washing is effected with carbon tetrachloride for removing the ethyl azelaate which is insoluble in diluted HCl. The amino-ester is regenerated by the addition of 2.08 liters of 2.6 N solution of sodium hydroxide. The upper layer is decanted. There is obtained 0.98 kg. of pure, light yellow ethyl amino-pelargonate, and 60 gs. of ethyl azelaate are extracted from the carbon tetrachloride wash solutions. Thus 3.5 kgs. of oleic acid of 80% concentration is consumed in obtaining 1 kg. of ethyl amino-pelargonate. The yield is capable of providing by polycondensation, 0.77 kg. of the corresponding polyamide.

Other nitrilo acids of higher molecular weight can be substituted in the hereinbefore set out procedure and the corresponding omega amino-acids will be obtained.

It should be understood that the present invention is not limited to the specific compounds or procedures described herein but that it extends to all equivalents which will occur to those skilled in the art upon consideration of the scope of the claims appended hereto.

We claim:

1. A process for the preparation of omega aminoacid esters from nitrilo-carboxylic acids having a straight saturated carbon chain of 7 to 10 carbon atoms which comprises, esterifying the nitrilo-carboxylic acid by reacting the same with a lower molecular alkanol thereby forming a nitrilo-carboxylic acid ester, hydrogenating said ester by reacting the same during heating with hydrogen under pressure in the presence of a hydrogenation catalyst and of ammonia and also in the presence of a lower molecular alkanol in a quantity not substantially less than two times greater than the amount of the nitrilo ester employed which suppresses side reactions, and collecting the aminoacid ester formed.

2. A process for the preparation of omega aminoacid esters from nitrilo-carboxylic acid esters, which comprises, subjecting a lower molecular alkanol ester of a nitrilo-carboxylic acid having a straight saturated carbon chain of 7 to 10 carbon atoms to catalytic hydrogenation by heating the same under pressure in the presence of hydrogen, a hydrogenation catalyst, ammonia and a lower molecular alkanol, the latter two additions being present in amounts two to three times that of the nitrilo-ester employed, and collecting the aminoacid ester formed.

3. A process for the preparation of omega aminoacid esters from nitrilo-carboxylic acids having a straight saturated carbon chain of 7 to 10 carbon atoms which comprises, reacting a nitrilo-fatty acid with a lower molecular alkanol in the presence of an esterification catalyst thereby esterifying the acid, subjecting the nitrilo-fatty acid ester obtained to catalytic hydrogenation by heating the same under pressure in the presence of hydrogen, a hydrogenation catalyst, ammonia, and a lower molecular alkanol in an amount at least two times greater than the amount of the nitrilo ester employed, and purifying the aminoacid ester obtained.

4. A process for the preparation of omega aminoacid esters from nitrilo-carboxylic acids having a straight saturated carbon chain of 7 to 10 carbon atoms which comprises, reacting a nitrilo-fatty acid with a lower molecular alkanol in the presence of an esterification catalyst by a procedure involving adding the catalyst periodically during the reaction while removing the water formed as the reaction progresses, thereby esterifying the acid and providing the ester in high yield, hydrogenating said ester by reaction the same during heating with hydrogen under pressure in the presence of a hydrogenation catalyst and of ammonia and also in the presence of a lower molecular alkanol in a quantity not substantially less than two times greater than the amount of the nitrilo ester employed which suppresses side reactions, and purifying the aminoacid ester obtained.

5. The process of claim 4 wherein the water is removed during the reaction by azeotropic distillation.

6. A process for the preparation of omega aminoacid esters from nitrilo-carboxylic acids having a straight saturated carbon chain of 7 to 10 carbon atoms, which comprises, reacting a nitrilo-fatty acid with a lower molecular alkanol in the presence of an esterification catalyst by a procedure involving adding the catalyst periodically during the reaction while distilling off the water formed as the reaction progresses, thereby esterifying the acid, subjecting the nitrilo-carboxylic acid ester obtained to catalytic hydrogenation by heating the same under pressure in the presence of hydrogen, a hydrogenation catalyst, ammonia and a lower molecular alkanol, the latter two additions being present in amounts two to three times that of the nitrilo-ester employed, and collecting the aminoacid ester formed.

References Cited in the file of this patent

UNITED STATES PATENTS

| | | |
|---|---|---|
| 2,160,578 | Schmidt | May 30, 1939 |
| 2,365,295 | Schaaf et al. | Dec. 19, 1944 |
| 2,514,549 | Lincoln | July 11, 1950 |
| 2,552,814 | Ralston et al. | May 15, 1951 |
| 2,644,009 | Cash et al. | June 30, 1953 |

FOREIGN PATENTS

| | | |
|---|---|---|
| 597,305 | Germany | May 22, 1934 |